Figure 1:
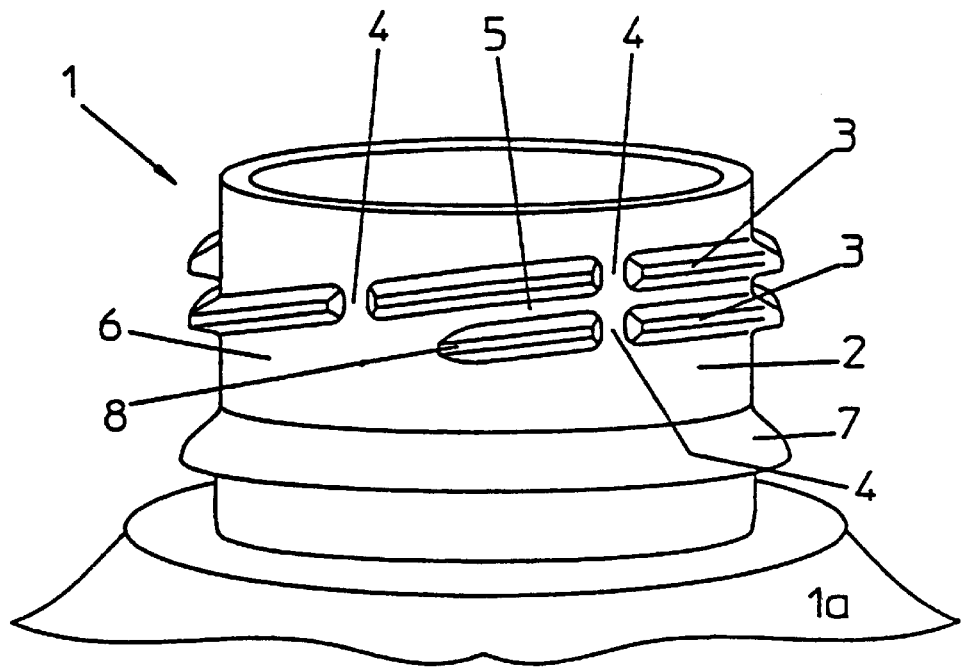

United States Patent

Dreyer et al.

[11] Patent Number: 6,006,930
[45] Date of Patent: Dec. 28, 1999

[54] BOTTLE FINISH AND CLOSURE CAP WITH DOUBLE SCREW THREAD

[75] Inventors: Lino Dreyer, Saint-Louis, France; Richard Jauslin, Arlesheim, Switzerland

[73] Assignee: Crown Cork AG, Reinach, Switzerland

[21] Appl. No.: 09/117,517

[22] PCT Filed: Jan. 13, 1997

[86] PCT No.: PCT/CH97/00009

§ 371 Date: Nov. 6, 1998

§ 102(e) Date: Nov. 6, 1998

[87] PCT Pub. No.: WO97/28057

PCT Pub. Date: Aug. 7, 1997

[30] Foreign Application Priority Data

Jan. 30, 1996 [CH] Switzerland .............................. 236/96
Nov. 19, 1996 [CH] Switzerland ............................. 2853/96

[51] Int. Cl.[6] .................................................... B65D 7/28
[52] U.S. Cl. ........................... 215/44; 215/252; 215/307; 215/329; 215/330; 220/288
[58] Field of Search ............................. 215/44, 252, 307, 215/329, 330, 331; 220/288, 296, 366.1

[56] References Cited

U.S. PATENT DOCUMENTS

| 4,007,848 | 2/1977 | Snyder ..................................... 215/44 |
| 4,369,889 | 1/1983 | Ostrowsky .............................. 215/246 |
| 4,392,055 | 7/1983 | Whitney . |
| 4,643,330 | 2/1987 | Kennedy ................................. 220/288 |
| 4,738,370 | 4/1988 | Urmston et al. ........................ 215/307 |
| 4,770,306 | 9/1988 | Szczesniak . |
| 4,948,001 | 8/1990 | Magly . |
| 5,257,705 | 11/1993 | De Santana .............................. 215/252 |
| 5,358,131 | 10/1994 | McCandless et al. ................... 215/252 |
| 5,431,291 | 7/1995 | LaBombarbe, Jr. ....................... 215/44 |
| 5,462,186 | 10/1995 | Ladina et al. . |

FOREIGN PATENT DOCUMENTS

| 0009854A1 | 4/1980 | European Pat. Off. . |
| 0263699B1 | 5/1991 | European Pat. Off. . |
| 9112577 | 2/1992 | Germany . |
| 2275047A | 8/1994 | United Kingdom . |
| WO 95/05322 | 2/1995 | WIPO . |

*Primary Examiner*—Stephen K. Cronin
*Attorney, Agent, or Firm*—Woodcock Washburn Kurtz Mackiewicz & Norris LLP

[57] ABSTRACT

For improving the venting behavior of containers with beverages containing carbon dioxide, a container finish (1) and a closure (11) is provided with a twin-start thread. The thread comprises in each case two threads (3, 13) which extend over an angle of 240° to less than 360°, preferably 280°, and which are arranged so as to be displaced at 180°. In this way, initial or first sections (5), in which the threads (3) overlap each other vertically, are formed on the outside surface (2) of the container finish (1), as well as second sections (6) in which, vertically, only one thread (3) is arranged. On the inside surface (12) of the closure (11), initial or first sections (15) are formed in which the threads (13) overlap each other vertically, as well as second sections (16) in which, vertically, only one thread (13) is arranged. In each of the sections (5, 6, 15, 16), at least one venting recess (4, 14) is arranged per thread, said venting recess interrupting the threads (3, 13).

31 Claims, 8 Drawing Sheets

BOTTLE FINISH AND CLOSURE CAP WITH DOUBLE SCREW THREAD

U.S. Pat. No. 5,462,186 discloses a closure having two threads which are circumferentially displaced at 180° with respect to each other and having venting slots intersecting the threads. Each thread extends over more than 360°, such that in circumferential direction there are always disposed at least two threads.

This invention concerns a container finish and a closure cap with a twin-start thread according to the preamble to the independent patent claims.

Various closure arrangements with multi-start threads on the closure and the container finish are state of the art. U.S. Pat. No. 4,770, 306, for example, discloses a closure that possesses a twin-start thread. Each thread extends over an angle of approximately 180°, and both threads are displaced so as to be diametrically opposite each other. An advantage of such twin- or multi-start threads is that the engagement between the threads of the closure and of the neck of the container is greater when compared with single-start threads. This enables the provision of shorter threads, resulting in a considerably shorter opening or closing travel of the closure.

In the case of containers that are filled with beverages containing carbon dioxide, the internal pressure will be raised when such a container is in the closed condition. On opening the container, sudden ejection of the closure due to the raised internal pressure should be avoided before the internal pressure is reduced. Such ejection is accompanied by a risk of injury to the consumer.

Also in the case of containers or closures provided with means to vent the closure on unscrewing, there are certain risks associated with misuse by the consumer. It is conceivable that, despite generally sufficient venting arrangements, due to intentionally rapid unscrewing, closures of containers containing carbon dioxide can be removed so rapidly that venting time is too short. The high-speed ejection of closures in the manner of a projectile can be intentionally induced in this way.

The purpose of the invention is to avoid the drawbacks of the state of the art, and in particular to create a container finish and a closure cap with a multi-start thread which possesses improved venting properties for reduction of the internal pressure during the opening sequence of containers containing beverages with a carbon dioxide content.

A further purpose of the present invention is to create a container finish and a closure cap which prevent the induction of excessively rapid unscrewing by the user, and ejection of the closure.

A further purpose of the present invention is to create a closure and a container finish which can be economically manufactured, in particular which require a small amount of material and, when in the closed condition, are reliably engaged with each other.

According to the invention, these purposes are fulfilled with a closure and with a container finish according to the characterizing portion of the independent patent claims.

A container finish possesses in principle a cylindrical outer surface on which two outwardly protruding threads are arranged, displaced by 180°. During opening, such an arrangement, displaced by 180°, prevents tilting or one-sided opening of the closure, and its ejection from the finish. The distribution of the force exerted from the container finish onto a closure is, with such an arrangement, point-symmetrical and diagonally opposed so that the risk of premature and one-sided ejection is reduced.

The threads are interrupted by venting recesses. During the opening sequence, the venting recesses permit reduction of a raised internal pressure within the container at a time when a closure is still firmly engaged with the container finish.

Each thread preferably extends over an angle of 240° to less than 360°, preferably to 340°. The selection of such an angular range will, in combination with a suitable selection of venting recesses, result in optimum venting behavior, as well as a secure interlock and force fit between the finish and the closure.

The minimum thread length of 240° is required in order to ensure a sufficient over-torque value.

Selection of an angle between 240° and 340° will result in two first sections of the outside surface in which both threads overlap vertically, and two second sections of the outside surface, in each of which, vertically, only one thread is arranged.

Good venting behavior is attained if, in each first section, at least one venting recess is arranged per thread, said venting recess being aligned with the thread recess of the other thread, and that at least one venting recess is arranged in each second section. The alignment of the venting recesses or "slots" preferably entails a vertical arrangement. A lateral displacement of the superimposed "slots" is possible as long as the free passage for exiting gaz is not essentially restricted.

In a particularly preferred embodiment, each such thread extends through an angle of 280°. Preferably, exactly one venting recess is used per section.

Apart from that, a particularly beneficial gaz-release behavior will result from an irregular (not axially symmetrical) arrangement of the individual venting recesses.

The individual venting recesses are preferably formed to taper inwardly. The opening angle amounts to between 40° and 70°, preferably between 55° and 65°, and each venting recess extends over an angular range of 4° to 10°, preferably approximately 5°.

An optimal pitch for the thread lies within the range 3° to 4°, preferably approximately 3.5°.

On its outside surface, beneath both the threads, the container finish preferably possesses a retaining bead for holding an anti-tamper strip of the closure. The selection of the distance between the retaining element and the end of the thread in relation to the axial extent of both threads is significant for the opening behavior. The distance between the retaining bead and the thread end is selected to be less than 1.5 times and preferably equal to two-thirds of the vertical extent of the section of the container finish provided with threads. From the thread end to the end of the closure cap, the gaz seeks its way between the inside of the closure and the outside of the container mouth.

The longer the distance between the container thread end and the retaining element, the longer the distance that must be selected between the thread end of the closure and an anti-tamper strip. The passage of the gaz will be longer, and the exiting gaz will be subjected to greater resistance.

By selecting a greater distance, a worsened gaz-release behavior will result.

A closure according to the invention essentially comprises a base and a skirt surrounding said base, said skirt possessing an essentially cylindrical inside surface. On the inside surface, two threads are arranged protruding radially inwards and displaced by 180°. In addition, venting recesses are provided on the inside, said venting recesses interrupting the threads.

Both threads preferably extend over an angle of 240° to less than 360°, and preferably to 340°. By means of the diametrically opposed arrangement of both threads, two first sections of the inside surface will result in which both the threads overlap vertically, and two second sections of the inside surface, in each of which, vertically, only one thread is arranged.

In each of the first sections, at least one venting arrangement is provided per thread, said venting arrangement being aligned with the venting recess of the other thread. In each second section, at least one venting recess is likewise provided.

Preferably, each thread extends over an angle of approximately 280°.

In conjunction with a container finish described above, particularly favourable opening behavior for a closure will result if, per thread, two venting recesses are arranged in each first section and one venting recess in each first section.

Apart from that, good gaz-venting behavior will also result if the individual venting recesses are arranged irregularly, e.g. not axially symmetrical.

The venting recesses preferably extend through an angular range of 4° to 10°, preferably 5°.

Apart from that, in a particularly preferred embodiment, the closure is provided with an anti-tamper strip. The anti-tamper strip is connected with the lower edge of the circumferential skirt of the closure by means of frangible bridges or a frangible line. On its inside, the anti-tamper strip possesses retaining means, said retaining means being able to be brought into engagement with a retaining bead of a container neck. Because two threads are used, their pitch can be selected to be large in comparison to single-start threads, without the engagement between the closure and a container finish being too small. Thus, a pitch angle of 3° to 4°, for example, can be selected, preferably 3.5°. Such a steep thread pitch also means, however, that the forces exerted onto the anti-tamper strip during the opening sequence will take effect during a shorter time. By selecting such steep threads, the dependability that an anti-tamper strip will tear on initial opening of a closure is increased.

A combination of the container finish as described above with the described closure is optimal. Both the closure threads come into rapid engagement with the container finish threads. Because two thread starts are arranged diametrically opposite each other, when screwing on the closure a maximum of half a turn must be made for the closure to come into engagement with the container finish. In the case of single threads, in the worst case a full rotation is required to attain this.

In a preferred embodiment, the closure and the container finish engage with each other within an angular range of 300° to 390°. This is possible due to the provision of two threads, even when each thread extends only over an angular range of 240° to less than 360°. Preferably, a mutual engagement of more than 360° is selected. By means of the specific arrangement of individual venting recesses, sequential and long-duration venting is attained. Preferably, four venting recesses are provided on the container finish, and six recesses on the closure. Each recess forms an uninterrupted path for gaz. If the recesses are asymmetrical and are not arranged at regular angular spacing on the container edge and the closure, during the unscrewing sequence, and thus during one rotation (engagement 360°), there will be 24 constellations where venting recesses on the closure coincide with venting recesses on the finish. During the entire unscrewing sequence, therefore, venting will sequentially reach a maximum value 24 times. In contrast, venting will occur at clearly fewer separate points in time with closures possessing conventional single threads and venting recesses.

To ensure good venting, at least one venting recess must be provided in each of the second sections where, vertically, only one thread is arranged. Because the exiting gaz is confronted with less resistance (only one instead of two threads), it can flow out much more rapidly. For reasons of safety, with single-start threads an arrangement where, vertically, only one thread is arranged at one point is not conceivable (insufficient mutual engagement).

Apart from that, it is advantageous to construct the closure and the container in such a way that the distance between the inner surface of the closure base and the side of the ends of the thread turns oriented towards the closure base is selected to be greater than the distance between the edge of the container mouth and the upper side of the thread start of the threads on the container finish.

In a further preferred embodiment, the thread start of the threads on the container finish is not rounded but cut-off vertically. In conjunction with a brake element on the ends of the threads of the closure, a brake arrangement is thus formed which exactly defines and limits the screw-on motion of the closure.

In a further preferred embodiment, the container finish and/or the closure cap are provided with additional means to brake the screw-off motion. Not only the container finish but also the closure cap can be provided with independently functioning means. It is also conceivable, however, to provide the container finish and the closure with mutually engaging means. As soon as the venting function occurs, the unscrewing motion of the closure is subjected to braking. Accordingly, there will be a greater period of time for venting. This prevents ejection of the closure, also with inappropriate handling (too rapid opening).

It is particularly simple to provide the container finish with at least one mechanical stop arranged between the threads, said mechanical stop being able to be brought into engagement with elements of a closure when the internal pressure is high. If the closure is raised axially when the internal pressure is high, elements of the closure engage with the mechanical stop on the container mouth and prevent a further unscrewing motion. As soon as the internal pressure in the container has been reduced by venting, the closure can be pressed downwards in an axial direction, by which means the elements of the closure disengage with the mechanical stop. The elements of the closure engaging with the mechanical stop on the container mouth can, for example, be interruptions of the threads, i.e. venting recesses.

A similar arrangement of mechanical stops can naturally also be attached to the inside of the closure cap. With that, mechanical stops are attached to the side of the threads oriented towards the cap base, said mechanical stops being able to engage with elements of the container mouth, in particular the threads on the container mouth, when the closure cap is lifted up by internal pressure.

It is also conceivable to provide braking elements which do not interrupt the unscrewing motion but apply a gradual braking effect. This uniform braking effect is practical for the user because it is less evident and requires no additional motion such as axially downward pressing of the closure. In a particularly simple embodiment, for continuous braking, protrusions can be provided on the inside surface of the skirt. These protrusions extend in a radial direction approximately far enough inwardly so that they make dragging contact with the maximum outside diameter of the container mouth, e.g. engage with the outside diameter of the thread. These protrusions can, for example, be arranged towards the lower edge of the skirt so that they first engage with the threads after a certain unscrewing motion and create a braking effect. The closure cap can thus be rotated off in an initial opening step without being subjected to braking. Only in a second step, during which the closure vents, will the braking elements become active.

Apart from that, in a particularly advantageous embodiment, in the axial direction toward the cap base the protrusions are reducing radially in thickness. This leads to a constantly rising braking force toward completion of the unscrewing motion.

Similar advantages can also be aimed at with a protrusion that in principle extends over the entire height of the threads and preferably ends adjacent to the lower edge of the skirt.

In a further embodiment, the inside surface of the cap skirt is provided with bridge-like protrusions between the threads, said bridge-like protrusions creating the braking effect.

Naturally, the braking elements portrayed for a closure can in each case also be applied to a container mouth to similar effect. Corresponding to their alternative action, in the case of protrusions on the container at most said protrusions must be positioned and formed slightly differently. Particularly in the case of protrusions with a thickness changing in the axial direction, said protrusions are preferably arranged adjacent to the edge of the mouth and possess a thickness that reduces in the axial direction towards the container edge.

The illustrated devices for braking the unscrewing motion also possess great advantages in relation to threads that are not twin-start threads. With any thread design for ventable closures, it can be advantageous to brake the unscrewing motion with such elements.

Figure 2:
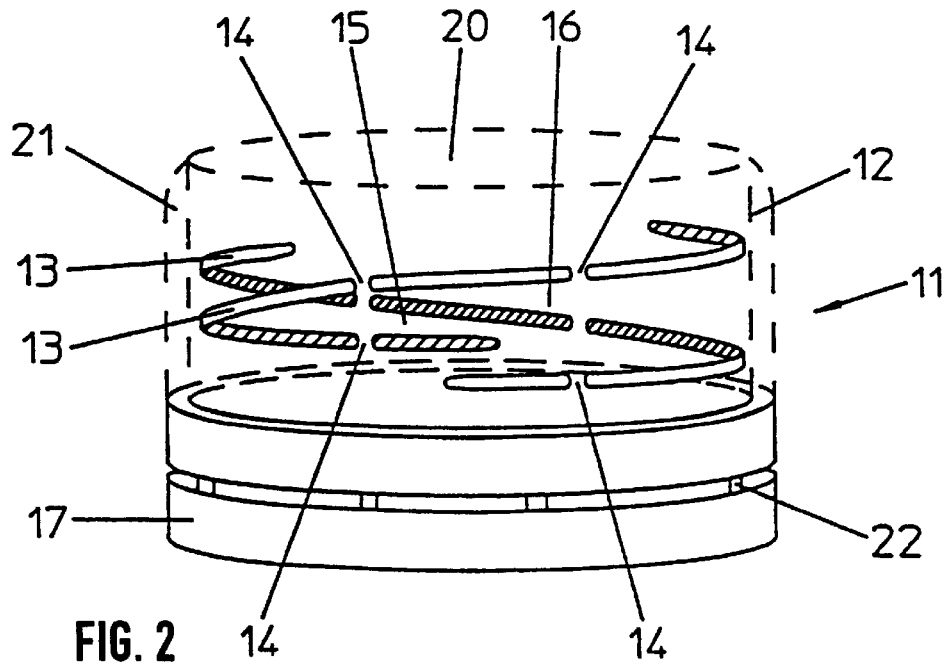
Figure 3:
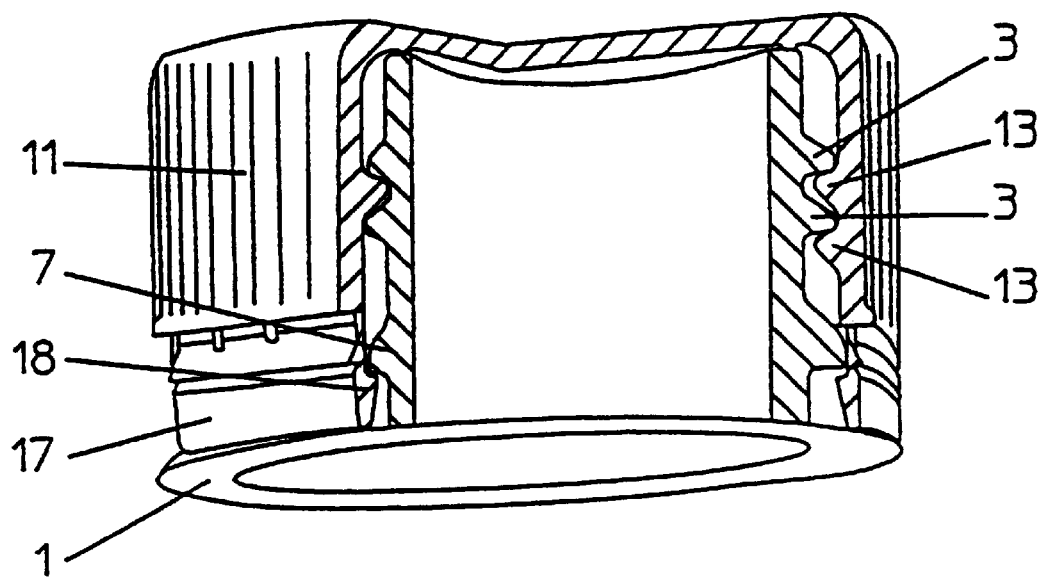
Figure 4:
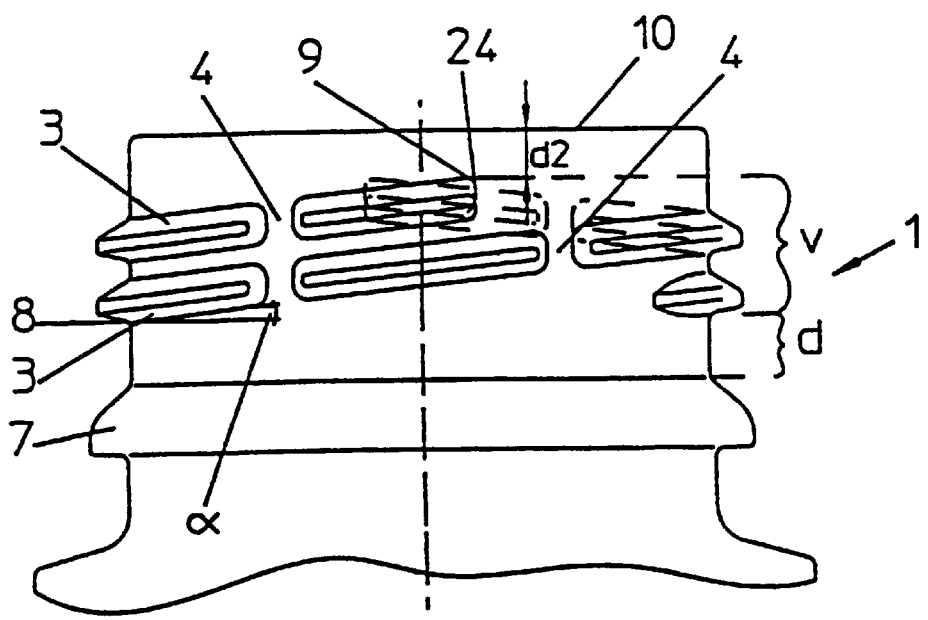
Figure 5:
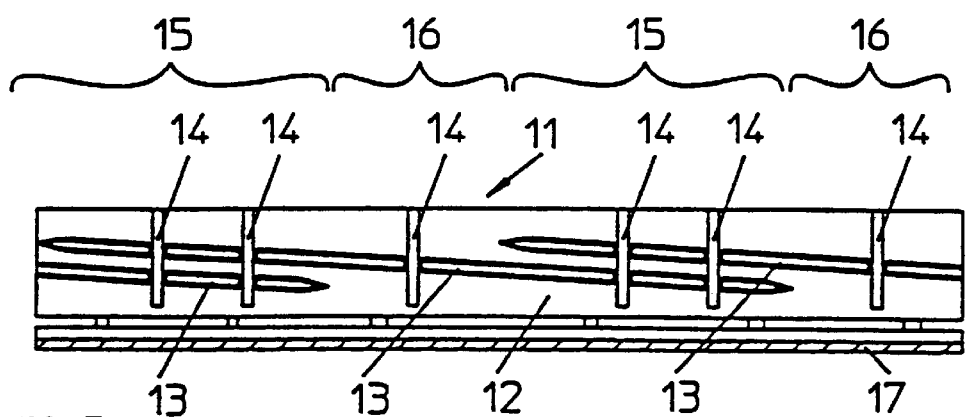
Figure 6:
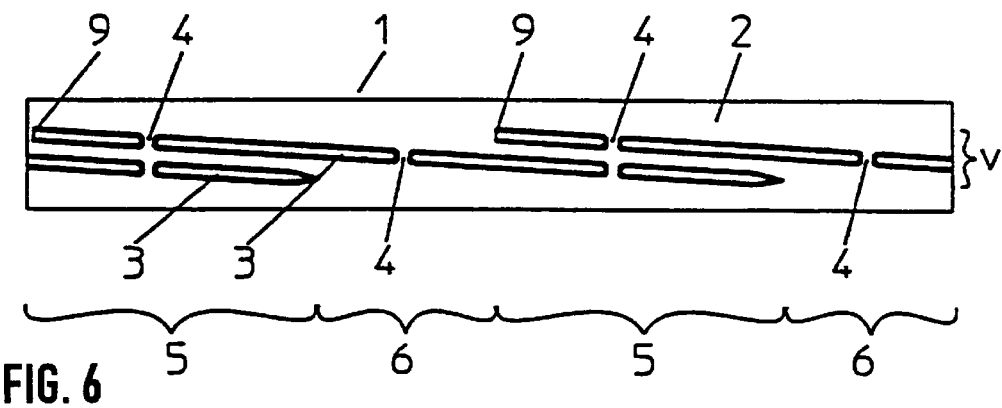
Figure 7:
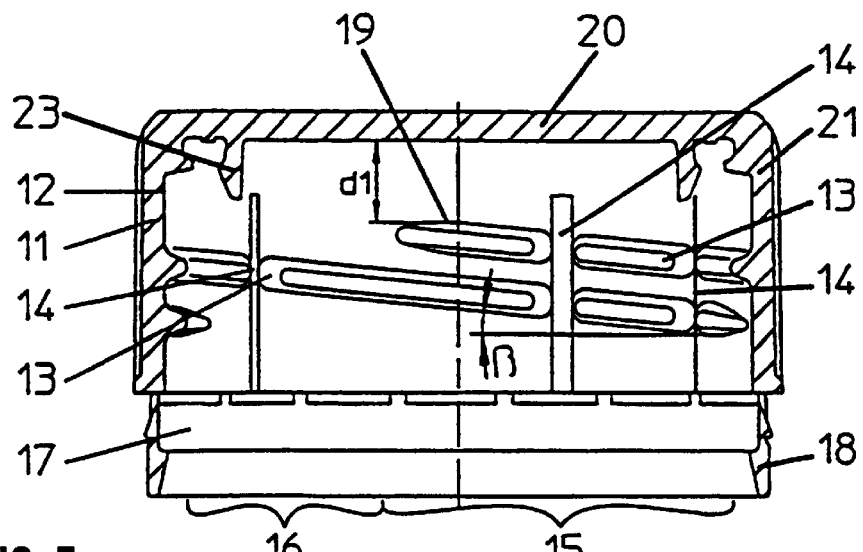
Figure 8:
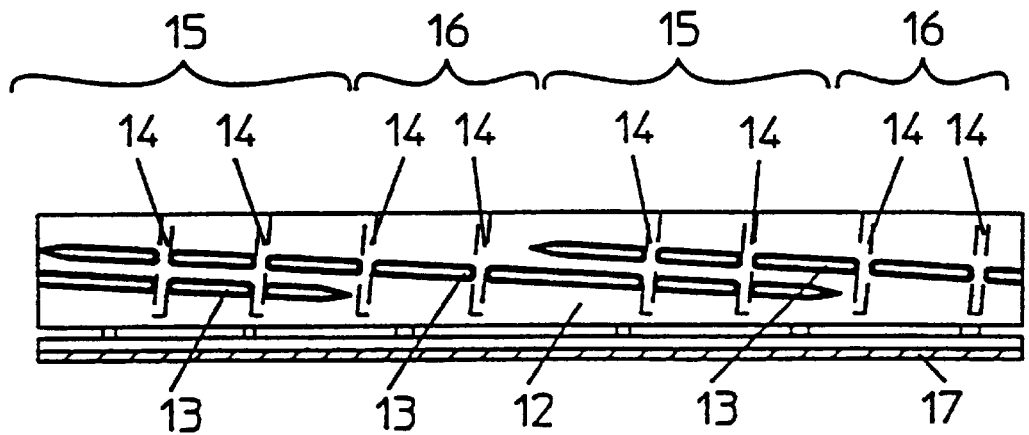
Figure 9:
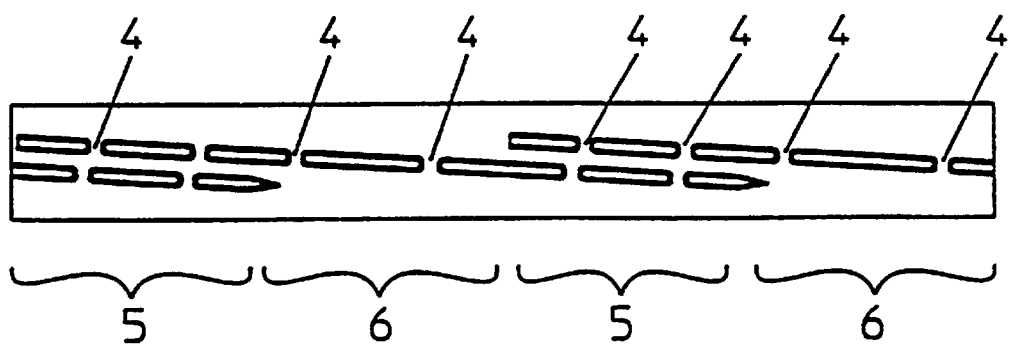
Figure 10:
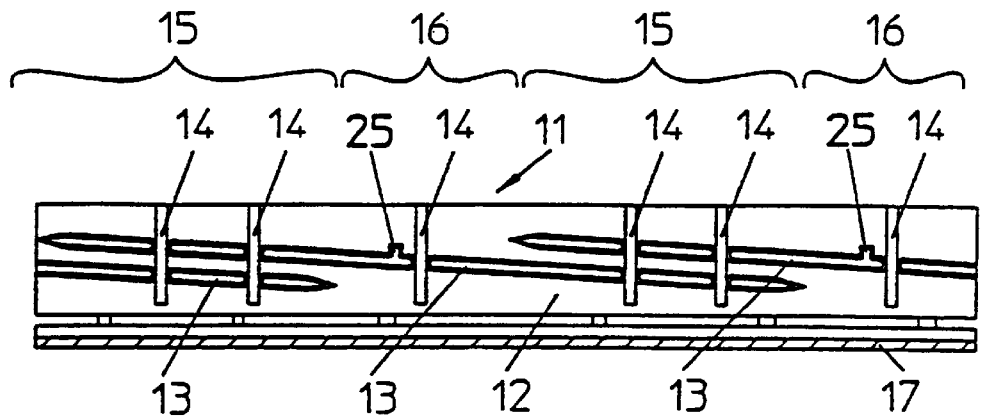
Figure 11:
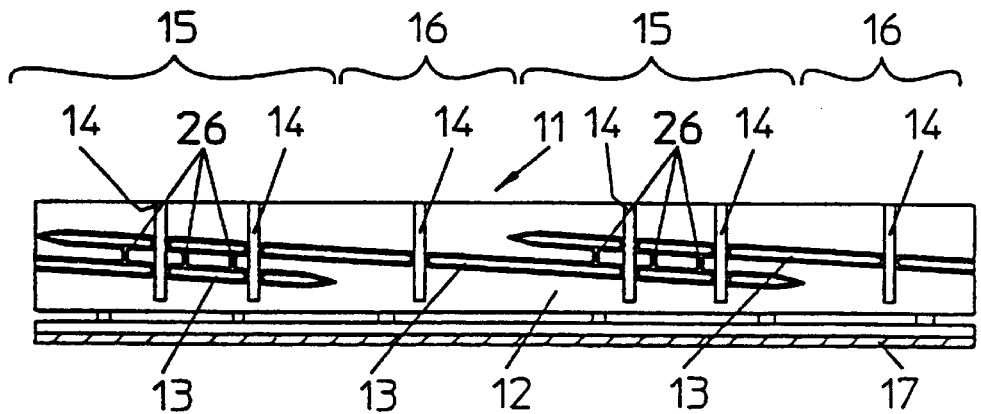
Figure 12:
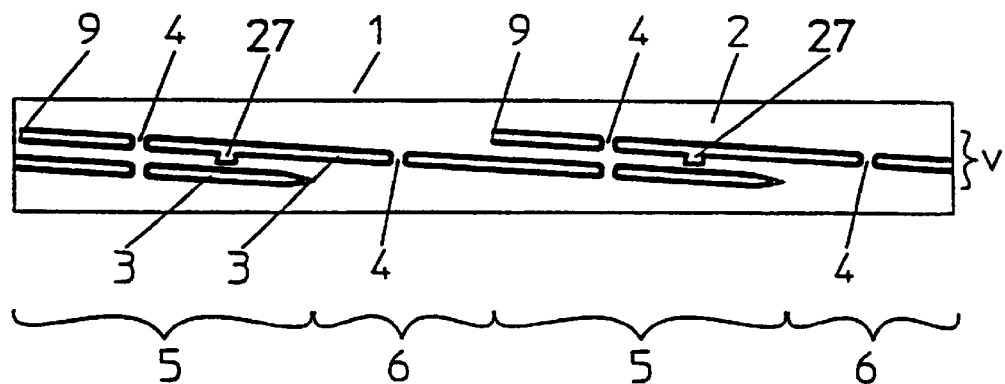
Figure 13:
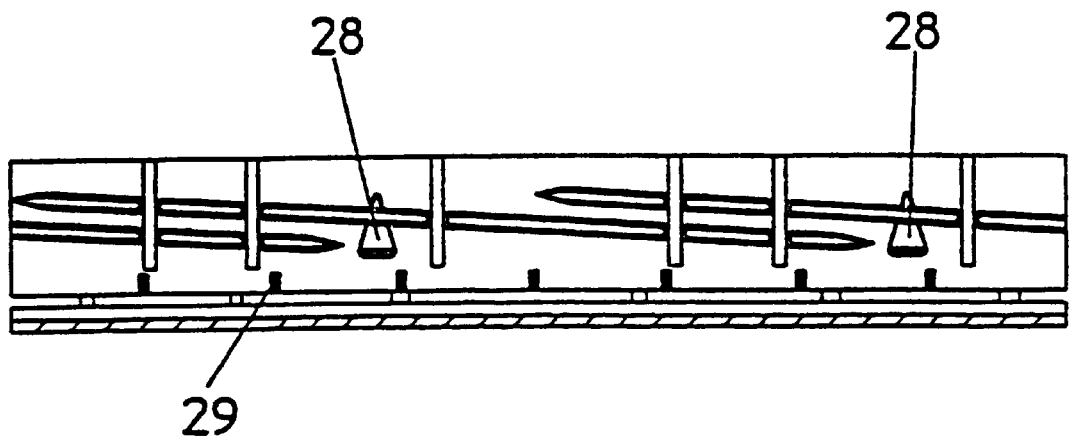
Figure 14:
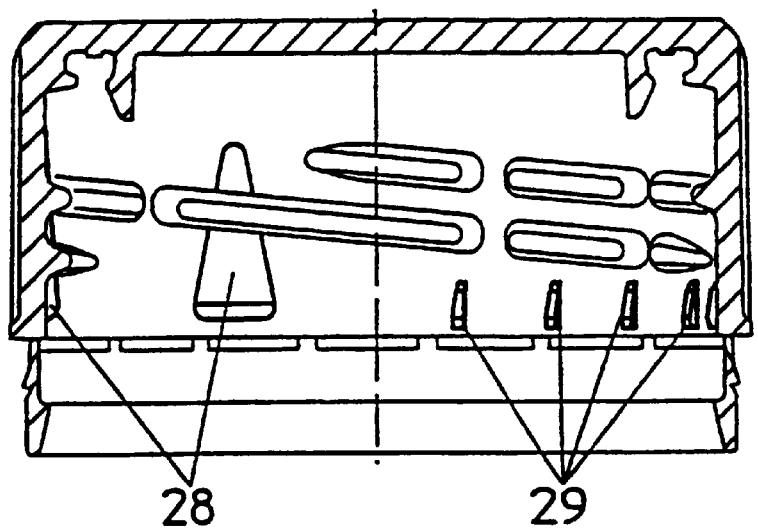
Figure 15A:
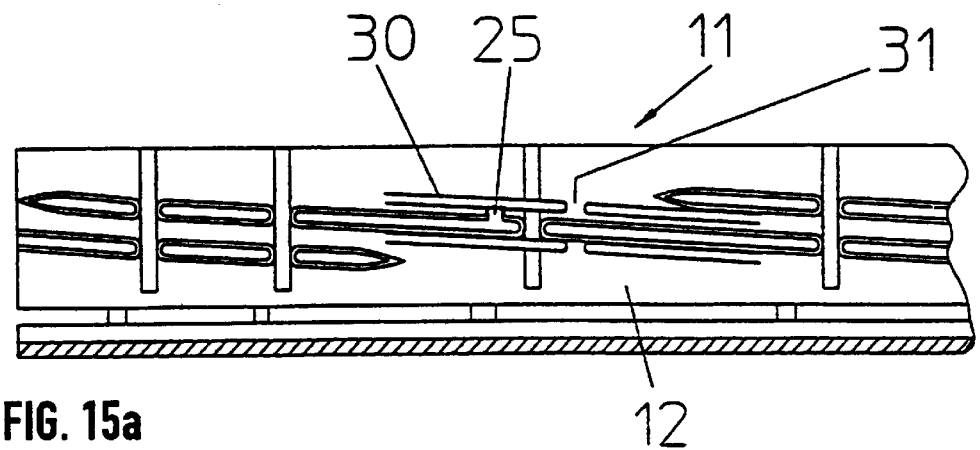
Figure 15B:
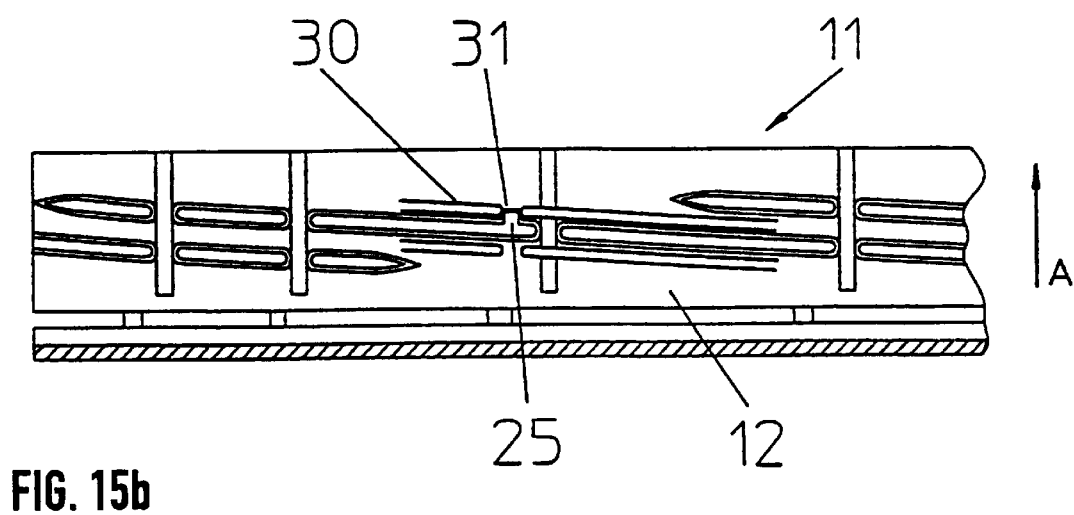
Figure 16A:
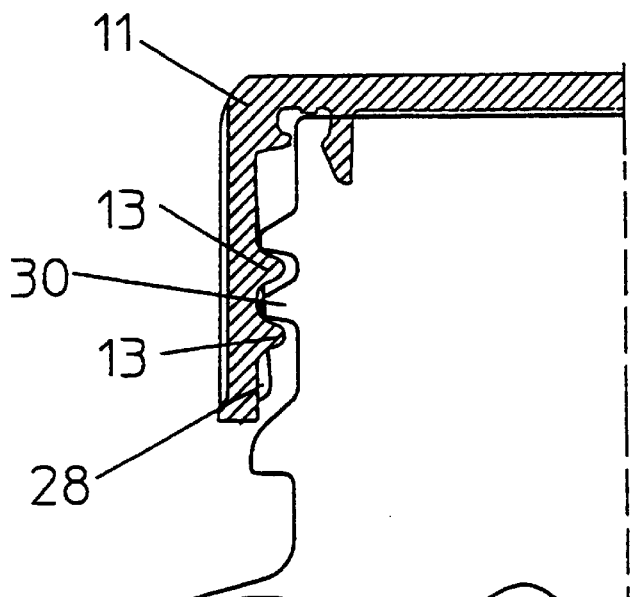
Figure 16B:
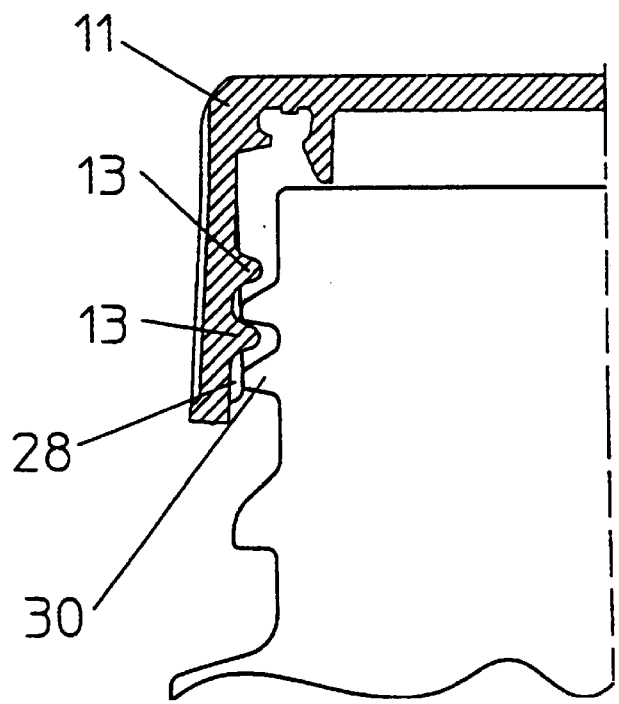

The invention is more closely explained on the basis of following drawings and embodiments; namely, FIG. 1 a three-dimensional view of a container finish according to the invention;

FIG. 2 a three-dimensional representation of the threads of a closure according to the invention, with a closure skirt depicted by dotted lines;

FIG. 3 a three-dimensional sectional drawing of a combination according to the invention of a closure and a container finish;

FIG. 4 a side view of the container finish according to FIG. 1;

FIG. 5 a developed side view of the inside of the closure according to FIG. 2;

FIG. 6 a developed view of the outside surface of the container finish according to FIG. 1;

FIG. 7 a cross section through the closure according to FIG. 2;

FIGS. 8 and 9 developed views of alternative embodiments of a closure and a container finish;

FIGS. 10 and 11 developed views of the inside of a closure with means for braking the unscrewing motion;

FIG. 12 a developed view of the outside surface of a container finish with means for braking the unscrewing motion of a closure;

FIG. 13 a developed view of the inside surface of a closure with an alternative embodiment of means for braking the unscrewing motion;

FIG. 14 a cross section through a closure according to the developed view from FIG. 13;

FIGS. 15a and 15b the developed view from FIG. 10 of a container mouth in two stages of an opening sequence, with threads depicted by dotted lines; and FIGS. 16a and 16b a cross section of a closure cap according to FIG. 14, fitted to a container, during two stages of an opening sequence.

FIG. 1 shows a container finish 1 possessing the features of the invention.

The finish 1 of a container 1a (not shown in greater detail here) possesses an outside surface 2 upon which two threads 3 are arranged. Both the threads 3 are arranged so as to be displaced by 180°, and each extend over more than 280°. In this way, two first sections 5 are formed in which the threads 3 overlap vertically. In contrast, only one thread 3 is arranged in two second sections 6. To enable a rapid reduction of pressure when removing a closure from the container finish 1, the threads 3 are interrupted by venting recesses 4. Per thread 3, one venting recess 4 is accommodated in each of the sections 5 or 6. In the sections 5 in which both the threads 3 overlap, the recesses are aligned vertically one above another. Apart from that, the container finish 1 possesses a retaining bead 7 which can be brought into engagement with the anti-tamper strip of a closure.

FIG. 2 shows the thread run of a closure 11 possessing the features of the invention. The closure possesses a base 20 and a circumferential skirt 21 attached to said base. Two radially inwardly protruding threads 13 are arranged on the inside 12 of the circumferential skirt 21. Both threads 13 are attached to the inside surface 12, displaced at 180° to one another. Each thread 13 extends through an angle of 280° so that initial or first sections 15 are formed in which two threads 13 lie vertically above one another, as well as second sections 16 in which, vertically, there is only one thread 13. In each of these sections 15, 16, each thread is interrupted at one point by a venting recess 14. In the first sections 15, in which both the threads overlap vertically, the venting recesses 14 on the individual threads 13 are mutually aligned. In this way, a recess crossing both threads will arise. An anti-tamper strip 17 is connected to the lower edge of the circumferential skirt 21 by means of frangible bridges 22.

FIG. 3 shows the combination of a closure 11 with a container finish 1 possessing the features of the invention. A portion of the closure skirt and container finish are shown so as to form a partial cross section. The threads 3 of the container finish 1 engage with the threads 13 of the closure 11. The anti-tamper strip 17 of the closure 11 is held firmly on the retaining bead 7 of the container finish 1 by means of retaining elements 18.

FIG. 4 shows a side view of the container finish 1 shown in FIG. 1. Both threads 3 are arranged with a pitch α, wherein a preferably amounts to 3.5°. Both the threads 3 are interrupted by venting recesses 4 and end towards the container mouth in a thread start 9. The thread start 9 possesses a clearly cut edge 24 to form a limit to the screw-on motion. A distance d2 is formed between the upper side of the thread start 9 and the edge of the container 10. A second distance d is formed between the lower side of the thread end 8 and the upper side of the retaining bead 7. The distance d amounts approximately to two thirds of the vertical extent v of the section of the container finish 1 provided with threads.

FIGS. 5 and 6 show developed views of the inside surface 12 of the closure 11 (FIG. 5) and the outside surface 2 of the container finish 1 (FIG. 6). On the inside surface 12 of the closure 11 there are, in each case, two sections 15 in which the threads 13 overlap vertically and two sections 16 in which, vertically, only one thread 13 is arranged. One venting recess 14 is provided in the sections 16, said recess interrupting the thread 13. In the sections 15, in each case two venting recesses 14 are provided per thread 13. The venting recesses 14 in the sections 15 are arranged in such a way that two recesses are created passing completely through both threads 13. The individual venting recesses 14 are arranged circumferentially with different intermediate spaces. For improvement of the gaz venting behavior, the inside surface 12 can additionally be provided with small depressions running transversely across the skirt 21 in the area of the recesses 14.

FIG. 6 shows the developed view of a container finish 1 to fit the closure according to FIG. 5. First sections 5 are formed where both the threads 13 overlap vertically. Second sections are defined where, vertically, only one thread 3 is arranged. In each of the sections 5 or 6 one venting recess 4 is provided per thread 3, said venting recesses interrupting the threads 3. In the sections 5, the venting recesses 4 of both threads 3 are aligned in such a way that an uninterrupted path for gaz is formed. The individual venting recesses 4 are not regularly positioned around the circumference, and do not coincide with the venting recesses 14 of the closure 11. With a rotation of 360° during removal of the closure 11 from the container finish 1, there will be 24 constellations where the gaz contained in the container can escape through superimposed venting recesses 4 and 14.

FIG. 7 shows a cross section through a closure according to FIG. 2. The closure preferably possesses a sealing means 23 which can be brought into engagement with the upper edge of a container finish. Retaining elements 18 are provided on the anti-tamper strip 17, said retaining elements being able to be brought into engagement with a retaining bead of a container finish. A distance d1 is defined between the upper side of the thread end 19 and the inner surface of the closure base. If the distance d1 is selected to be greater than the distance d2 from FIG. 4, an engagement of more than 280° can be selected with a combination of closure 11 and container finish 1, even when each of the threads 3, 13 only extend over an angle of 280°. Preferably, the relationship d1 to d2 is selected in such a way that the closure 11 engages with the container finish 1 over an angular range of 360°. The threads are arranged with an angle β of approximately 3.5°.

FIG. 8 shows the developed view of the inside surface 12 of an alternative embodiment of a closure 11. Two venting recesses 14 are provided in each of the sections 16 in which, vertically, only one thread 13 is arranged. Accordingly, two additional venting constellations will arise during the opening sequence, and thus a still more regular gaz venting behavior. The recesses 14 in the sections 15 are mutually aligned in a line that is gently inclined in relation to the vertical.

FIG. 9 shows the outside surfaces 2 of an alternative embodiment of a container finish 1. Each thread 3 is interrupted by two venting recesses in each of the sections 5, 6. The venting recesses 4 in the sections 5 align in a line that is slightly inclined in relation to the vertical.

FIG. 10 shows the developed view of the inside surface 12 of a closure 11 which is additionally provided with means to brake the unscrewing movement of the closure. A protrusion 25 forms a mechanical stop surface which can come into engagement with elements of the container finish and so momentarily interrupt the unscrewing motion. With high internal pressure in the container, the closure 11 is pressed upwards in the axial direction. If the closure is in position on a container with venting recesses, with appropriate dimensioning the protrusions 25 will snap into the venting recesses on the container finish. Naturally, other form features can be provided as a counterpart to the protrusion 25. Due to the coordinated connection between the protrusions 25 and the container mouth, the closure cannot be subjected to further rotation before the internal pressure of the container has reduced, permitting the closure to be pressed axially downwards. By means of an axially downward motion, the protrusion 25 will become disengaged from the container finish, and the closure can be subjected to further unscrewing.

FIG. 11 shows a closure 11 which, on its inside, is provided with bridges 26 between the threads 13. The bridges 26 are dimensioned in such a way that they define a free inside diameter that is approximately the same size or slightly smaller than the maximum outside diameter of the threads of the container to be closed. As a result, the threads of a container rest upon the bridges 26 between the threads 13 of a closure 11 and create a dragging effect which leads to braked unscrewing of the closure. Depending on the dimensioning of the bridges 26, a greater or lesser braking effect can be defined at different phases of the unscrewing motion. As long as the threads of a container finish rest upon all the bridges 26, the closure will be subjected to uniform braking in the unscrewing motion.

FIG. 12 shows the developed view of a container finish 11 which is provided on its outside surface with threads 12. A protrusion 27 is provided between the threads 3, said protrusion forming a mechanical stop for features of a closure. If a closure is pressed axially upwards due to the pressure prevailing in the container, it will run up against the protrusion 27 during the unscrewing sequence, wherein the unscrewing motion will be interrupted. As soon as the gaz pressure within the container is reduced, the closure can be pressed downwards, and enables a continuation of the unscrewing sequence.

FIGS. 13 and 14 show an embodiment of a closure which is provided on its inside with two different protrusions for uniform braking of the unscrewing motion. Ribs 29 are provided on the lower edge of the closure skirt, said ribs dragging against the outside diameter of a container mouth and thus creating a braking effect. Apart from that, protrusions 28 are provided in the area of the threads, said protrusions likewise creating a uniform braking effect of the unscrewing sequence. Naturally, the protrusions 28 and the ribs 29 also function independently.

The protrusions 28 and the ribs 29 are formed in such a way that there is no abrupt stop to the unscrewing motion, but rather a continuous braking action. In particular, the thickness of the protrusions 28 and the ribs 29 is formed to increase in the axial direction towards the lower end of the closure cap. The protrusions 28 and the ribs 29 extend from the inside surface of the closure cap. With such a design, a braking effect is attained that is almost zero at commencement of the unscrewing motion. By means of continued unscrewing of the closure, the free inside diameter of the contact surface of the protrusions 28 or the ribs 29, said contact surface dragging against the outside surface of the container finish, will become increasingly small. This leads to a greater pressing force of the protrusions 28 or ribs 29 on the outside surface of the container mouth, and thus to increased frictional force and braking effect.

FIG. 15a shows the developed view of the inside surface 12 of a closure 11, said surface being provided with a protrusion 25, said protrusion forming a mechanical stop (also see FIG. 10). A complementary thread 30 on a bottle mouth is depicted by a dotted line. The thread 30 possesses interruptions 31 (venting recesses). In FIG. 15a, the closure 11 is in a position on the container mouth where the venting function has not yet properly begun. By means of the pressure prevailing in the container, the closure cap 11 with its thread 13 is pressed upwards towards the thread 30 of the container mouth.

FIG. 15b shows the same section of the developed view of an inside wall 12 of a closure cap 11 which, compared with FIG. 15a, is slightly rotated, e.g. opened. With that, the protrusion 25 on the upper side of the thread 13 of the closure cap 11 is engaged with the threads in the venting recess 31, said venting recess 31 being between two portions of the thread 30 on the container mouth. By means of the overpressure prevailing in the inside of the container, the closure cap is pressed upwards in the axial direction (arrow A). Accordingly, the protrusion 25 will come into engagement with the venting recess 31, e.g. with the start of a segment of the thread 30. This engagement remains for as long an overpressure prevails inside the container. During this time, the overpressure can be reduced thanks to the venting recesses in the closure cap and on the container mouth. Only when the pressure on the inside of the container has sunk below a specific reference value can the closure cap 11 be pressed downwards again (in the opposite direction to arrow A), the mechanical stop becoming disengaged with the venting recesses 31. After pressing down the closure cap 11, the unscrewing motion can be continued. Naturally, it is conceivable to form a container mouth in such a way that the mechanical stop 25 engages not with the recesses 31 but with counter stops specially formed for this purpose.

The advantage of this arrangement is that the closure cap only be completely removed from the container when the pressure in the inside of the closed container has been completely or almost completely reduced.

FIGS. 16a and 16b schematically show two stages of the unscrewing sequence of a closure, as has been shown in FIG. 14. The closure 11 is screwed onto a container mouth and is, with its threads 13, engaged in the counter thread 30 of said container mouth. A protrusion 28 extends from the inside surface of the closure cap 11, so that its surface makes contact the surface of the counter thread 30 on the container mouth. As can be seen in FIG. 16a, the pressing effect of the protrusion 28 is still slight when the closure is completely fitted. At the point where the protrusion 28 possesses the greatest thickness, there is still no contact with the thread 30 of the container mouth. Only during the unscrewing sequence (see FIG. 16b) does the protrusion 28, due to its increasing thickness, increasingly engage with the thread 30 of the container mouth. Due to the increasing thickness, the pressing force of the protrusion 28 on the thread 30 increases, by which means the unscrewing motion of the closure cap is braked. It is important that the venting function commences before widening of the outside by the protrusion (or protrusions) becomes too great. With the protrusions 28, the unscrewing motion is indeed subjected to braking, but the engagement between container mouth and closure cap also becomes less (due to expansion of the cap wall). It is therefore important that the inside pressure in the container is reduced before the protrusion 28 has reached its full effect.

Inasmuch as the invention is subject to modifications and variations, the foregoing description and accompanying drawings should not be regarded as limiting the invention, which is defined by the following claims and various combinations thereof:

We claim:

1. Container finish (1) with an essentially cylindrical outside surface (2) with two threads (3) protruding radially outwards, said threads being arranged on the outside surface (2) so as to be displaced by 180°, and with venting recesses (4), said venting recesses interrupting the threads (3), characterized in that each thread (3) extends over an angle of 240° to less than 360°, preferably 340°, wherein both the threads (3) overlap each other vertically in two first sections (5) of the outside surface (2) and wherein, vertically, only one thread (3) is arranged in each of two second sections (6), and wherein, per thread (3), at least one venting recess is provided in each of the first sections (5), said venting recess being essentially vertically aligned with the venting recess (4) of the other thread (3), and wherein at least one venting recess (4) is provided in each of the second sections (6).

2. Container finish according to claim 1, characterized in that each thread (3) extends over an angle of 280°.

3. Container finish according to claim 1, characterized in that, in each first section (5) and in each second section (6), one venting recess (4) is provided per thread.

4. Container finish according to claim 1, characterized in that the venting recesses (4) are arranged at irregular spacings in the circumferential direction.

5. Container finish according to claim 1, characterized in that the venting recesses widen radially outwards, wherein the widening angle amounts to between 40° and 70°, preferably between 55° and 65°, and wherein the venting recesses (4) extend over an angle of 4° to 10°.

6. Container finish (1) according to claim 1, characterized in that the thread possesses a pitch angle ($\alpha$) from 3° to 4°, preferably 3.5°.

7. Container finish (1) according to claim 1 which, beneath the threads (3), possesses a circumferential retaining bead (7) for an anti-tamper strip, characterized in that the distance (d) between the upper side of the retaining bead (7) and the lower side of the thread end (8) is less than 1.5 times the axial extent of the thread (3).

8. Container finish (1) according to claim 1, characterized in that the container finish (1) is provided with means (27) for braking the unscrewing motion of a closure.

9. Container finish according to claim 8, characterized in that the means for braking the unscrewing motion of a closure comprises at least one protrusion (27) arranged between the threads (3), said protrusion being able to be brought into engagement with elements of a closure during the unscrewing sequence when the pressure inside the container is raised.

10. Closure (11) with a closure base (20) and a circumferential skirt (21) affixed to said base, said skirt possessing an essentially cylindrical inside surface (12) with two threads (13) protruding radially inwards, said threads being arranged so as to be displaced by 180° on the inside surface (12) and possessing venting recesses (14) interrupting the threads (13), characterized in that each thread (13) extends over an angle of 240° to less than 360°, preferably 340°, wherein both threads (13) overlap each other vertically in two first sections (15) of the inside surface (12) and wherein, vertically, in each case only one thread (13) is arranged in two second sections (16), and wherein, in each first section (15), at least one venting recess (14) is provided per thread (13), said venting recess aligning essentially vertically with the venting recess (14) of the other thread (13) and wherein, in each second section (16), at least one venting recess (14) is provided.

11. Closure according to claim 10, characterized in that each thread (13) extends over an angle of 280°.

12. Closure according to claim 10, characterized in that, in each of the first sections (15), each thread (13) is interrupted by two venting recesses (14) and that the threads (13) in each second section (15) are interrupted by one venting recess (14).

13. Closure according to claim 10, characterized in that the venting recesses (14) are arranged with irregular spacings in the circumferential direction.

14. Closure according to claim 10, characterized in that each venting recess (14) extends over an angular range of 4° to 10°, preferably 5°.

15. Closure according to claim 10, characterized in that the pitch angle (β) of the threads (13) amounts to 3° to 4°, preferably 3.5°.

16. Closure according to claim 10, characterized in that the closure possesses an anti-tamper strip (17), said anti-tamper strip being connected to the lower edge of the circumferential skirt (21) by means of frangible bridges (22).

17. Closure according to claim 10, characterized in that the closure (1) possesses means (15, 26, 28, 29) for braking the unscrewing motion of the closure (1).

18. Closure according to claim 17, characterized in that the means for braking are formed as bridges (26) arranged between the threads (13).

19. Closure according to claim 17, characterized in that the protrusions comprise protrusions (25) attached between the threads (13), said protrusions being able to be brought into engagement with elements of the container during the unscrewing sequence when the pressure within the container closed by the closure is raised.

20. Closure according to claim 17, characterized in that said means are formed as protrusions (25, 26, 28, 29) protruding radially inwardly from the inside surface of the closure.

21. Closure according to claim 20, characterized in that the protrusions (29) are arranged so as to be adjacent to the lower edge of the closure cap.

22. Closure according to claim 20, characterized in that the protrusions (28) essentially extend over the entire height of the threads (13) of the closure.

23. Closure according to claim 20, characterized in that the protrusions (28, 29) possess a thickness that reduces towards the cap base in the axial direction.

24. Closure arrangement with a container finish (1) and a closure cap (11) for closing a container (1a), wherein the container finish (1) possesses an essentially cylindrical outside surface (2) with two threads (3) protruding radially outwards, said threads being arranged so as to be displaced by 180° on the outside surface (2), as well as venting recesses (4) interrupting the threads (3), and wherein the closure (11) possesses a closure base (20) and attached to said base a circumferential skirt (21) with an essentially cylindrical inside surface (12), two radially inwardly protruding threads (13), displaced by 180°, being arranged on said inside surface, as well as venting recesses (14) which interrupt the threads (13), wherein the threads (13) of the closure (11) are able to be brought into engagement with the threads (3) of the container finish (1), characterized in that each thread (3) of the container finish (1) and each thread (13) of the closure (11) extends over an angle of 240° to less than 360°, preferably 340°, wherein, in two first sections (5) of the outside surface (2) of the container finish (1), both the threads (3) of the container finish (1) overlap each other vertically, and wherein, vertically, in each case only one thread (3) is arranged in two second sections (6) of the outside surface (2) of the container finish (1), and wherein both the threads (13) of the closure (11) overlap each other vertically in two first sections (15) of the inside surface (12), and wherein, vertically, in each case only one thread (13) is arranged in two second sections (16) of the inside surface (12), and wherein, in each of the first sections (5) of the outside surface (2) of the container finish (1), per thread (3), at least one venting recess (4) is provided, said venting recess being aligned essentially vertically with the venting recess (4) of the other thread (3), as well as at least one venting recess (4) in each of the second sections (6), and wherein at least one venting recess (14) is provided per thread (13) in each of the first sections (15) of the inside surface (12) of the closure (11), said venting recess being aligned essentially vertically with the venting recess (14) of the other thread (13), as well as at least one venting recess (14) in each of the second sections (16).

25. Closure arrangement according to claim 24, characterized in that the threads (3, 13) in each case extend over an angle of 280°.

26. Closure arrangement according to claim 24, characterized in that in each case exactly one venting recess (4, 14) is provided per thread (3, 13) in the second section (6, 16) of the outside surface (2) of the container finish (1) and the inside surface (12) of the closure (11), that one venting recess (4) is provided per thread (3) in the first sections (5) of the container finish (1), and that two venting recesses (14) are arranged per thread (13) in the first sections (15) of the closure (11).

27. Closure arrangement according to claim 24, characterized in that the venting recesses (3) on the outside surface (2) of the container finish (1) and the venting recesses (13) on the inside surface (12) of the closure (11) are in each case arranged in the circumferential direction with mutually different distances.

28. Closure arrangement according to claim 24, characterized in that the pitches of the threads (3, 13) amount to 3° to 4°, preferably 3.5°.

29. Closure arrangement according to claim 24, characterized in that the closure (11) is engaged with the container finish (1) over an angular range of 300° to 390°, preferably 360°.

30. Closure arrangement according to claim 24, characterized in that the thread starts (9) of the threads (3) are defined by a vertical edge (24), said edge being able to be engaged with a braking element on the inside surface (12) of the closure (11).

31. Closure arrangement according to claim 24 wherein a distance (d2) is formed between the upper edge of the threads (3) of the container finish (1) and the upper edge (10) of the container finish (1), and wherein a distance (d1) is formed between the side of the thread end (19), said thread end being oriented toward the cap base (20), of the thread (13) and the cap base, characterized in that the distance (d1) is greater than the distance (d2).

* * * * *

UNITED STATES PATENT AND TRADEMARK OFFICE
CERTIFICATE OF CORRECTION

| | |
|---|---|
| PATENT NO. : 6,006,930 | |
| DATED : December 28, 1999 | |
| INVENTOR(S) : Lino Dreyer and Richard Jauslin | |

It is certified that error appears in the above-identified patent and that said Letters Patent is hereby corrected as shown below:

Title page,
Item [56], References Cited, U.S. PATENT DOCUMENTS, delete "2/1997" and insert -- 2/1976 -- and delete "9112577" and insert -- G 9112577.4 --;

Column 1,
Lines 4-9, delete the paragraph "U.S. Pat. No. 5,462,186 discloses a closure having two threads which are circumferentially displaced at 180° with respect to each other and having venting slots intersecting the threads. Each thread extends over more than 360°, such that in circumferential direction there are always disposed at least two threads." and insert the same paragraph, beginning at line 41, -- U.S. Pat. No. 5,462,186 discloses a closure having two threads which are circumferentially displaced at 180° with respect to each other and having venting slots intersecting the threads. Each thread extends over more than 360°, such that in circumferential direction there are always disposed at least two threads. --;

Column 2,
Lines 26, 52, 57 and 58, delete "gaz" and insert -- gas --;
Lines 31 and 59, delete "gaz-release" and insert -- gas-release --;

Column 3,
Line 16, delete "favourable" and insert -- favorable --;
Line 19, delete "gaz-venting" and insert -- gas-venting --;
Line 60, delete "gaz." and insert -- gas. --;

Column 4,
Line 5, delete "gaz" and insert -- gas --;

Column 6,
Line 45, delete "wherein a" and insert -- wherein $\alpha$ --;

Column 7,
Lines 2, 14, 19 and 43, delete "gaz" and insert -- gas --;

Column 8,
Line 25, delete "gaz" and insert -- gas --;

Column 9,
Line 11, delete "long an" and insert -- long as --;
Lines 32-33, delete "makes contact the" and insert -- makes contact with the --;

UNITED STATES PATENT AND TRADEMARK OFFICE
CERTIFICATE OF CORRECTION

PATENT NO. : 6,006,930
DATED : December 28, 1999
INVENTOR(S) : Lino Dreyer and Richard Jauslin It is certified that error appears in the above-identified patent and that said Letters Patent is hereby corrected as shown below:

Column 11,
Line 9, delete "(15, 26, 28, 29)" and insert -- (25, 26, 28, 29) --;

Column 12,
Line 21, delete "section" and insert -- sections --.

Signed and Sealed this

Fourteenth Day of September, 2004

JON W. DUDAS
*Director of the United States Patent and Trademark Office*